United States Patent [19]

Ishii et al.

[11] Patent Number: 5,246,777
[45] Date of Patent: Sep. 21, 1993

[54] FIBER OR FILM FORMED FROM A STABILIZED POLYOLEFIN COMPOSITION

[75] Inventors: Tamaki Ishii, Suita; Shinichi Yachigo, Toyonaka, both of Japan

[73] Assignee: Sumitomo Chemical Company, Limited, Osaka, Japan

[21] Appl. No.: 830,524

[22] Filed: Feb. 4, 1992

Related U.S. Application Data

[63] Continuation of Ser. No. 677,131, Mar. 29, 1991, abandoned.

[30] Foreign Application Priority Data

Apr. 25, 1990 [JP] Japan .................................. 2-111373

[51] Int. Cl.$^5$ .......................... D02G 3/00; C08K 5/15; C08K 5/3435
[52] U.S. Cl. .................................... 428/364; 524/102; 524/108; 524/120; 524/128; 524/153; 524/291; 206/389
[58] Field of Search ............... 524/108, 102, 103, 128, 524/291, 120, 153; 428/364; 206/389

[56] References Cited

U.S. PATENT DOCUMENTS

| | | | |
|---|---|---|---|
| 4,234,707 | 11/1980 | Rody et al. | 525/437 |
| 4,666,959 | 5/1987 | Weissberger et al. | 523/137 |
| 4,719,257 | 1/1988 | Ishii et al. | 524/108 |
| 4,721,744 | 1/1988 | Ishii et al. | 524/103 |
| 4,829,112 | 5/1989 | Ishii et al. | 524/108 |
| 4,985,480 | 1/1991 | Fukui et al. | 524/108 |
| 5,081,170 | 1/1992 | Yagi et al. | 524/102 |

FOREIGN PATENT DOCUMENTS 0341925 11/1989 European Pat. Off. .

*Primary Examiner*—Paul R. Michl
*Assistant Examiner*—Tae H. Yoon
*Attorney, Agent, or Firm*—Wenderoth, Lind & Ponack

[57] ABSTRACT

A polyolefin resin is stabilized against heat, oxidation and light as well as against discoloration by combustion gas and nitrogen oxide gas by incorporating therein the following two components:

(A) a hindered phenolic compound represented by the following formula (I):

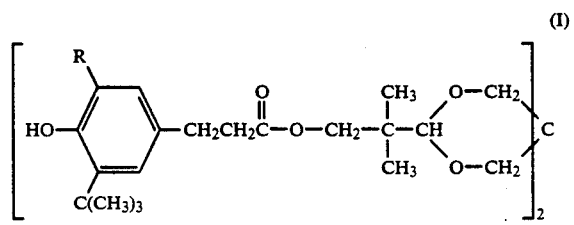

wherein R is a hydrogen atom or an alkyl of 1 to 3 carbon atoms; and (B) a hindered piperidine compound represented by the following formula (II):

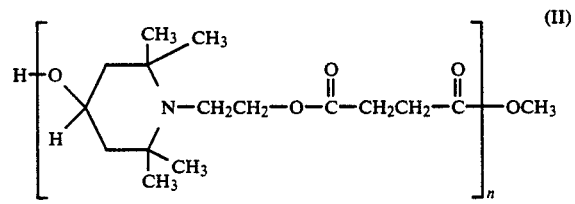

wherein n is 2 to 20.

16 Claims, No Drawings

FIBER OR FILM FORMED FROM A STABILIZED POLYOLEFIN COMPOSITION

This application is a continuation of now abandoned application, Ser. No. 07/677,131 filed Mar. 29, 1991.

FIELD OF THE INVENTION

The present invention relates to a stabilized polyolefin composition. More precisely, it relates to a polyolefin composition which is not only stable against heat, oxidation and light but also extremely stable against discoloration caused by combustion gas and nitrogen oxide gas (hereinafter referred to as NOx gas).

BACKGROUND OF THE INVENTION

Polyolefin resins such as polyethylene and polypropylene are extensively used as materials for shaped articles such as fibers, films, sheets and other articles, as having excellent physical, chemical and electrical properties. However, such polyolefin resins have a problem that they are deteriorated by the action of heat, oxygen and light so that the mechanical properties are thereby lowered.

In order to prevent such deterioration, various stabilizers have heretofore been used. For instance, it is known to use various phenolic compounds, such as:
2,6-di-t-butyl-4-methylphenol;
1,3,5-tris(3,5-di-t-butyl-4-hydroxybenzyl) isocyanurate; and
tetrakis[3-(3,5-di-t-buty1-4-hydroxyphenyl)propionyloxymethyl]methane,
for the purpose of preventing deterioration of polyolefin resins by heat and oxidation. In addition, for the purpose of further improving the anti-oxidant property of such phenolic compounds, it is also known to use, together with them, sulfur-containing compounds such as:
dilauryl thiodipropionate;
dimyristyl thiodipropionate; and
pentaerythritol tetrakis(3-dodecylthiopropionate).

On the other hand, for the purpose of preventing deterioration of the resins caused by light, it is known to use various light-resisting agents, for example, benzophenone compounds, benzotriazole compounds, nickel-chelate compounds and hindered amine compounds, singly or in combination of two or more of them. Further, various proposals of combining such known stabilizers have also been made.

However, although the polyolefin compositions which have heretofore been proposed could give favorable results which would be satisfactory in some degree with respect to the stability against heat, oxidation and light, they still have some problems in the field where the shaped articles such as fibers and films are exposed to severe conditions of production and use. Under this situation, they could not be said t be always sufficient and satisfactory in practical use.

For instance, with respect to fibers as one example of the shaped articles, the conditions of producing and working them are severer than any other general thick articles and therefore they must first be resistant to a high temperature in the production step. In the drying step after the fiber formation, a city gas or kerosene is often used as a heat source. As the fibers would easily be discolored by the combustion gas from the heat source, they are desirably also resistant to such discoloration. Further, even after the fibers have been made into fibrous products, the products are also exposed to exhaust gas, such as combustion gas from fuel of cars outdoors as well as combustion gas from oil stoves indoors. Under these conditions, since the products are easily discolored by NOx gas in the exhaust gas, they are also desirably resistant to such discoloration.

Despite the current situation mentioned above, the polyolefin compositions which have heretofore been proposed could not be said to be sufficiently stable against discoloration caused by combustion gas and NOx gas, though they would be stable at least against heat, oxidation and light. Therefore, it has been strongly desired to develop stabilizer systems which are effective not only for stabilizing polyolefin compositions against heat, oxidation and light but also for satisfactorily stabilizing them against discoloration caused by combustion gas and NOx gas.

SUMMARY OF THE INVENTION

The present inventors earnestly studied for the purpose of developing polyolefin compositions which have a practically sufficient stability against heat, oxidation and light and which are additionally stable against discoloration caused by combustion gas and NOx gas and, as a result, have found that combination of a particular hindered phenolic compound and a particular hindered piperidine compound gives an extremely excellent formulation to satisfactorily stabilize the polyolefin compositions. On the basis of this finding, they have hereby achieved the present invention.

Thus the present invention provides a polyolefin composition comprising a polyolefin and the following components:

(A) a hindered phenolic compound represented by the following formula (I):

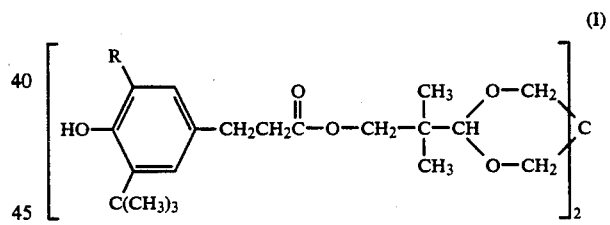

wherein R is a hydrogen atom or an alkyl of 1 to 3 carbon atoms; and (B) a hindered piperidine compound represented by the following formula (II):

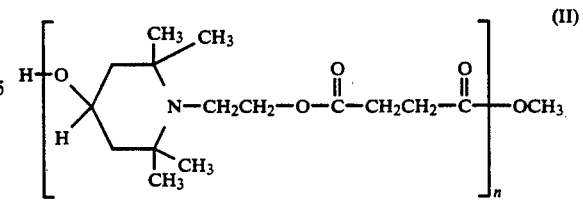

wherein n is 2 to 20.

The present invention also provides a stabilizer system comprising the hindered phenolic compound of the above formula (I) and the hindered piperidine compound of the above formula (II).

The present invention further provides a method for stabilizing a polyolefin by incorporating therein the hindered phenolic compound of the above formula (I)

and the hindered piperidine compound of the above formula (II), and still further provides a method for producing a polyolefin formed product by blending a polyolefin with the hindered phenolic compound of the above formula (I) and the hindered piperidine compound of the above formula (II), and forming the blend.

DETAILED DESCRIPTION OF THE INVENTION

Polyolefins for use in the present invention include homopolymers of α-olefins such as ethylene, propylene, butene-1, isobutene, 3-methylbutene-1, hexene-1 and 4-methylpentene-1, and random or block copolymers to be obtained from α-olefins of two or more different kinds. More precisely, they include polyethylene, polypropylene, polybutene-1, polyisobutene, poly-3-methylbutene-1, polyhexene-1, poly-4-methylpentene-1, ethylene/propylene ethylene/butene-1 copolymer, ethylene/4-methylpentene-1 copolymer, propylene/butene-1 copolymer, propylene 4-methylpentene-1 copolymer, and ethylene/propylene/butene-1 copolymer. Above all, especially preferred is polypropylene. In accordance with the present invention, a hindered phenolic compound of the above formula (I) and a hindered piperidine compound of the above formula (II) are incorporated into such a polyolefin. In the hindered phenolic compounds of the above formula (I), R is a hydrogen atom or an alkyl of 1 to 3 carbon atoms. Examples of the alkyl group are methyl, ethyl, n-propyl and isopropyl. R is preferably methyl, from the viewpoint of stability against heat and oxidation. One example of the hindered phenolic compounds (I) is Sumilizer GA-80, i.e. 3,9-bis[2-{3-(3-t-butyl-4 hydroxy-5-methylphenyl)-propionyloxy}-1,1-dimethylethyl]-2,4,8,10-tetraoxaspiro[5,5]undecane, supplied by Sumitomo Chemical Co., Ltd. The hindered piperidine compounds of the above formula (II) are described, for example, in U.S. Pat. No. 4,234,707. As one example thereof, Tinuvin 622 LD, i.e. a polycondensate of dimethyl succinate with 1-(2-hydroxyethyl)-4-hydroxy-2,2,6,6-tetramethylpiperidine, is known as a commercial product of Ciba-Geigy Co.

In accordance with the present invention, the amount of the hindered phenolic compound of the above formula (I) to be used and that of the hindered piperidine compound of the above formula (II) to be used each are 0.01 to 1 part by weight, preferably 0.02 to 0.5 part by weight, per 100 parts by weight of the polyolefin to be stabilized therewith. If each amount is less than 0.01 part by weight, the intended effect could not be attained sufficiently. On the contrary, if it is more than 1 part by weight, any further elevated effect corresponding to such large amounts could not be attained but use of such is economically disadvantageous. The hindered phenolic compound of the above formula (I) contributes especially to improving the stability of polyolefins against heat and oxidation, and the hindered piperidine compound of the above formula (II) contributes especially to improving the stability of them against light. Additionally, combination of the compounds of these two kinds surprisingly gives a polyolefin composition having an extremely high resistance against discoloration by combustion gas and NOx gas.

As opposed to this case, where the hindered phenolic compound of the above formula (I) is combined with any other commercial product of typical oligomeric hindered piperidine compounds than those of the above formula (II), the combination would often be sufficiently effective for stabilizing polyolefins against heat, oxidation and light and would sometimes be superior to the combination of the present invention only with respect to the stabilization of polyolefins against heat, oxidation and light. However, it is generally the case that polyolefins as stabilized by the former combination falling outside the scope of the present invention easily discolor when exposed to combustion gas and NOx gas. On the other hand, where the hindered piperidine compound of the above formula (II) is combined with any other commercial product of typical hindered phenolic compounds than those of the above formula (I), most results are unsatisfactory with respect to an of the stability of polyolefins against heat and oxidation, the stability of them against light and the stability of them against discoloration caused by combustion gas and NOx gas.

The polyolefin composition of the present invention may contain any other additives, such as antioxidants, light stabilizers, metal soaps, nucleating agents, lubricants, antistatic agents, metal deactivators, flame retardants, pigments and fluorescent brighteners, provided that the additives do not interfere with the characteristics of the composition.

Of usable antioxidants, preferred are phosphorus-containing compounds. Specifically, addition of an organic phosphorous antioxidant gives further improvement of the stability to the polyolefin composition of the present invention. As preferred examples of the organic phosphorous antioxidants usable in the present invention for this purpose, the following are referred to:
Bis(2,4-di-t-butylphenyl) pentaerythritol diphosphite;
Tris(2,4-di-t-butylphenyl) phosphite;
Bis(2,6-di-t-butyl-4-methylphenyl) pentaerythritol diphosphite;
Distearyl pentaerythritol diphosphite; and
Tetrakis(2,4-di-t-butylphenyl) 4,4'-biphenylene diphosphonite.

Where such phosphorus-containing compounds are used as an antioxidant, the content of the compound is preferably about 0.01 to 1 part by weight, more preferably about 0.02 to 0.5 part by weight, per 100 parts by weight of the polyolefin in th composition.

As a means of incorporating the hindered phenolic compound of the above formula (I) and the hindered piperidine compound of the above formula (II) and optionally other additives into a polyolefin, any and every method which is suitable for forming a homogeneous blend may be employed. Precisely, the starting materials may be blended simultaneously, or they may be blended separately in plural steps, or they may be blended as a master batch. The materials may be kneaded by any conventional method. For instance, they may well be kneaded with a single-screw extruder or a double-screw extruder.

The polyolefin composition of the present invention is useful in the field of fibers, films and other shaped articles which are desired to be resistant to discoloration, especially in the field of such shaped articles which are often exposed to combustion gas and NOx gas. In particular, it is useful in the field of fibers.

Shaping of the composition may be effected by various known methods. For instance, where the composition is formed into films, any general film extruder may be used. As the case may be, stretching may be combined with the film extrusion. Where the composition is formed into fibers, it may well be melt-spun by any conventional method. Melt-spinning may also be combined with subsequent stretching, if desired.

Next, the present invention will be explained in more detail by way of the following examples, which, however, do not whatsoever restrict the scope of the present invention.

EXAMPLE 1

| Formulation | |
|---|---|
| Unstabilized Polypropylene | 100 parts by weight |
| Calcium Stearate | 0.05 part by weight |
| Test Additives | See Table 1 |

The above materials were blended by a mixer for 5 minutes and the resulting blend was extruded at 240° C. through a 30 mm$\phi$ extruder to pelletize the blend. The pellets were subjected to melt-spinning at 280° C. in the usual manner to obtain unstretched filaments. The filaments were stretched 3.5 times the length at 130° C. to form polypropylene fibers of 6 denier. Twenty of the 6 denier fibers were twisted to make yarn and subjected to testing. The various tests were conducted in the following manners and the results are shown in Table 1.

(1) Heat Resistance:

The previously prepared twisted yarn was singlewise wound in a width of 2 cm around a 40×60×2 mm stabilized polypropylene sheet as separately prepared. The thus wound yarn was put in a Geer oven of 140° C., whereupon the time before yarn breakage was measured. On the basis of the time, the stability against heat and oxidation was evaluated.

(2) Light Resistance:

The previously prepared twisted yarn was singlewise wound in a width of 2 cm around a 40×60×1 mm paper board. This was put in a carbon arc Fade-O-meter having a black panel temperature of 83° C., whereupon the time before yarn breakage was measured. On the basis of the time, the stability against light was evaluated.

(3) Resistance to Discoloration by Combustion Gas:

The previously prepared twisted yarn was singlewise wound in a width of 2 cm around a 40×60×2 mm stabilized polypropylene sheet as separately prepared. The thus wound yarn was exposed to combustion gas of a city gas of 98° C. for 30 minutes, whereupon the difference in the yellowness index (hereinafter referred to as "$\Delta YI$") between the non-exposed yarn and the exposed yarn was measured. On the basis of the value, the degree of discoloration of the sample was evaluated.

The device as used for combustion gas exposure was a stainless steel cylinder having a diameter of 25 cm and a length of 70 cm, where combustion gas was generated from the bottom and the sample to be tested was put in the upper portion.

(4) Resistance to Discoloration by NOx gas:

The previously prepared twisted yarn was singlewise wound in a width of 2 cm around a 40×60×1 mm paper board, and the thus wound yarn was used as a sample. The sample was exposed to an atmosphere having an NOx concentration of 2 % by volume for 24 hours, in accordance with JIS L 0855 "Testing Method for Colour Fastness to Nitrogen Oxides", whereupon "$\Delta YI$" before and after exposure was measured. On the basis of the value obtained, the degree of discoloration of the sample was evaluated.

Symbols of test additives shown in Table 1 indicate the following compounds.

A-1: 3,9-Bis[2-{3-(3-t-butyl-4-hydroxy-5-methylphenyl)proppionyloxy}-1,1-dimethyethyl]-2,4,8,10-tetraoxaspiro[5.5]undercane A-2: Tetrakis[3-(3,5-di-t-butyl-4-hydroxyphenyl)propionyloxymethyl]methane A-3 1,3,5-Tris(4-t-butyl-3-hydroxy-2,6-dimethylbenzyl) isocyanurate A-4: 2,4-Bis(n octylthio)-6-(4-hydroxy-3,5-di-t-butylanilino)-1,3,5-triazine A-5: 1,3,5-Tris(3,5-di-t-butyl-4-hydroxybenzyl) isocyanurate B-1: Polycondensate of dimethyl succinate with 1-(2-hydroxyethyl)-4-hydroxy-2,2,6,6-tetramethylpiperidine (TINUVIN 622 LD, product by Ciba-Geigy)

B-2:Poly [{6-(1,1,3,3-tetramethylbutyl)imino-1,3,5-triazine-2,4-diyl}{(2,2,6,6-tetramethyl-4-piperidyl-)imino}]hexamethylene{(2,2,6,6-tetramethyl-4piperidyl)imino}hexamethylene{(2,2,6,6-tetramethyl-4-piperidyl)imino}) (CHIMASSORB 944 LD, product by Ciba-Geigy)

B-3 Poly[(6-morpholino-s-triazine-2,4-diyl){(2,2,6,6-tetramethyl -4-peperidyl)imino}hexamethylene{(2,2,6,6-tetramethyl-4-piperidyl) imino}) (CYASORB UV-3366. product by American Cyanamid)

C-1: Tris(2,4-di-t-butylphenyl) phosphite

C-2: Bis(2,4-di-t-butylphenyl) pentaerythritol diphosphite

C-3: Tetrakis(2,4-di-t-butylphenyl) 4,4'-biphenylene diphosphonite

TABLE 1

| No. | Additives (upside: kind downside: amount as part by weight) | | | Heat Resistance: 140° C., yarn breakage time (hr) | Light Resistance: 83° C., yarn breakage time (hr) | Resistance to Discoloration by combustion gas ($\Delta YI$) | Resistance to Discoloration by NOx gas ($\Delta YI$) |
|---|---|---|---|---|---|---|---|
| | Phenolic Compound | Piperidine Compound | Phosphorous Antioxidant | | | | |
| This Invention | | | | | | | |
| 1 | A-1 0.1 | B-1 0.1 | | 210 | 340 | 3.7 | 8.9 |
| 2 | A-1 0.15 | B-1 0.1 | | 330 | 350 | 4.0 | 9.2 |
| 3 | A-1 0.1 | B-1 0.15 | | 220 | 430 | 3.9 | 9.0 |
| 4 | A-1 0.15 | B-1 0.15 | | 340 | 440 | 4.1 | 9.3 |
| 5 | A-1 0.1 | B-1 0.1 | C-1 0.1 | 230 | 360 | 3.0 | 8.7 |
| 6 | A-1 0.1 | B-1 0.1 | C-2 0.1 | 220 | 350 | 3.3 | 8.9 |

TABLE 1-continued

| No. | Additives (upside: kind downside: amount as part by weight) Phenolic Compound | Piperidine Compound | Phosphorous Antioxidant | Heat Resistance: 140° C., yarn breakage time (hr) | Light Resistance: 83° C., yarn breakage time (hr) | Resistance to Discoloration by combustion gas (ΔYI) | Resistance to Discoloration by NOx gas (ΔYI) |
|---|---|---|---|---|---|---|---|
| 7 | A-1 0.1 | B-1 0.1 | C-3 0.1 | 220 | 350 | 3.4 | 9.1 |
| For Comparison | | | | | | | |
| 8 | A-1 0.1 | B-2 0.1 | | 290 | 390 | 12.5 | 10.5 |
| 9 | A-1 0.05 | B-1 0.1 | | 200 | 380 | 11.6 | 9.9 |
| 10 | A-1 0.1 | B-2 0.05 | | 220 | 260 | 11.8 | 10.3 |
| 11 | A-1 0.05 | B-2 0.05 | | 140 | 250 | 10.4 | 9.6 |
| 12 | A-1 0.1 | B-3 0.1 | | 280 | 380 | 12.6 | 10.4 |
| 13 | A-2 0.1 | B-1 0.1 | | 200 | 330 | 8.1 | 20.5 |
| 14 | A-2 0.1 | B-1 0.1 | C-1 0.1 | 210 | 340 | 7.9 | 20.3 |
| 15 | A-2 0.1 | B-2 0.1 | | 280 | 370 | 15.3 | 21.7 |
| 16 | A-3 0.1 | B-1 0.1 | | 120 | 240 | 4.8 | 10.5 |
| 17 | A-3 0.1 | B-1 0.1 | C-1 0.1 | 130 | 250 | 4.5 | 10.2 |
| 18 | A-3 0.1 | B-2 0.1 | | 210 | 300 | 8.3 | 12.1 |
| 19 | A-4 0.1 | B-1 0.1 | | 130 | 250 | 4.6 | 10.3 |
| 20 | A-4 0.1 | B-1 0.1 | C-1 0.1 | 150 | 270 | 4.3 | 10.0 |
| 21 | A-4 0.1 | B-2 0.1 | | 220 | 310 | 8.1 | 11.5 |
| 22 | A-5 0.1 | B-1 0.1 | | 120 | 250 | 6.7 | 14.2 |
| 23 | A-5 0.1 | B-1 0.1 | C-1 0.1 | 130 | 270 | 6.4 | 13.9 |
| 24 | A-5 0.1 | B-2 0.1 | | 200 | 320 | 9.2 | 16.5 |

In accordance with the present invention, there is provided a polyolefin composition which has a sufficient stability against heat, oxidation and light for practical use and which additionally has a high resistance also to discoloration by combustion gas and NOx gas.

While the invention has been described in detail and with reference to specific embodiments thereof, it will be apparent to one skilled in the art that various changes and modifications can be made therein without departing from the spirit and scop thereof.

What is claimed is:

1. A fiber formed from a polyolefin composition consisting essentially of 100 parts by weight of a polyolefin and the following components:
    (A) 0.01 to 1 part by weight, per 100 parts by weight of the polyolefin, of a hindered phenolic compound represented by the following formula (I):

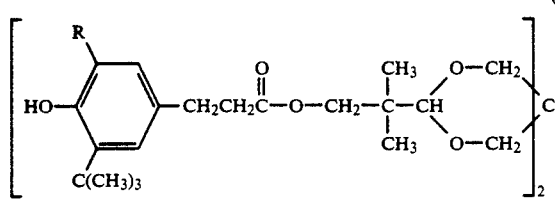

whrein R is a hydrogen atom or an alkyl or 1 to 3 carbon atoms; and
    (B) 0.01 to 1 part by weight, per 100 parts by weight of the polyolefin, of a hindered piperidine compound represented by the following formula (II):

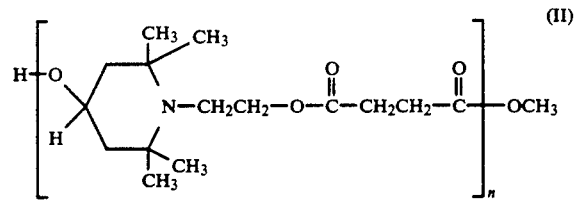

wherein n is 2 to 20.

2. The fiber according to claim 1, wherein said polyolefin is polyethylene, polypropylene, polybutene-1, polyisobutene, poly-3-methylbutene-1, polyhexene-1, poly-4-methylpentene-1, ethylene/propylene copolymer, ethylene/butene-1 copolymer, ethylene/4-methylpentene-1 copolymer, propylene/butene-1 copolymer, propylene/4-methylpentene-1 copolymer, or ethylene/propylene/butene-1 copolymer.

3. The fiber according to claim 1, wherein said polyolefin is polypropylene.

4. The fiber according to claim 1, wherein the hindered phenolic compound is 3,9-bis[2-{3-(3-t-butyl-4- hydroxy-5-methylphenyl)propionyloxy}-1,1-dimethylethyl]-2,4,8,

5. The composition according to claim 1, wherein said hindered phenolic compound and said hindered piperidine compound are present each in an amount of 0.02 to 0.5 part by weight per 100 parts by weight of the polyolefin.

6. The composition according to claim 1, which further comprises essentially of an organic phosphorous antioxidant.

7. The fiber according to claim 6, wherein said organic phosphorous antioxidant is bis(2,4-di-t-butylphenyl) pentaerythritol diphosphite, tris(2,4-di-t-butylphenyl) phosphite, bis(2,6-di-t-butyl-4-methylphenyl) pentaerythritol diphosphite, distearyl pentaerythritol diphosphite, or tetrakis(2,,4-di-t-butylphenyl) 4,4'-biphenylene diphosphonite.

8. The fiber according to claim 6, wherein said organic phosphorous antioxidant is present in an amount of 0.01 to 1 part by weight per 100 parts by weight of the polyolefin.

9. The composition according to claim 8, wherein the amount of said organic phosphorous antioxidant is 0.02 to 0.5 part by weight per 100 parts by weight of the polyolefin.

10. A method for producing a polyolefin formed product which comprises blending a polyolefin with:
(A) a hindered phenolic compound represented by the following formula (I):

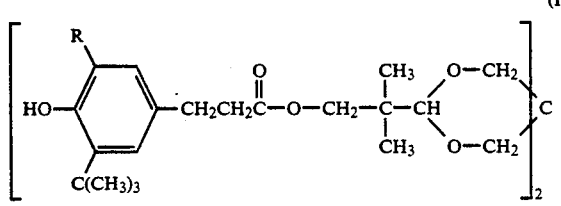

wherein R is a hydrogen atom or an alkyl of 1 to 3 carbon atoms; and
(B) a hindered piperidine compound represented by the following formula (II):

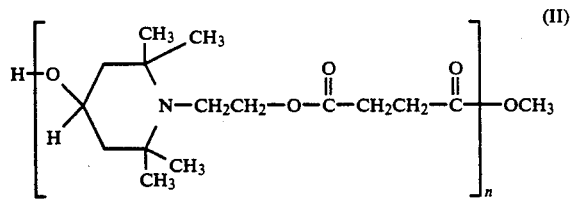

wherein n is 2 to 20;
and forming the blend into a fiber or film, whereby the formed fiber or film is stabilized against heat, oxidation and light as well as against discoloration by combustion gas and nitrogen oxide gas.

11. The method according to claim 10, wherein said polyolefin is further blended with an organic phosphorous antioxidant.

12. The method according to claim 10, wherein said formed product is a fiber, and said forming is spinning and stretching to obtain the fiber.

13. A polyolefin fiber or film prepared from a composition comprising 100 parts by weight of a polyolefin in combination with the following components:
(A) 0.01 to 1 part by weight, per 100 parts by weight of the polyolefin, of a hindered phenolic compound represented by the following formula (I):

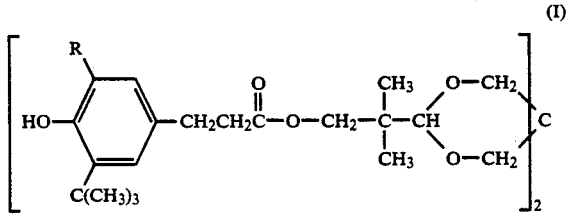

wherein R is a hydrogen atom or an alkyl of 1 to 3 carbon atoms; and
(b) 0.01 to 1 part by weight, per 100 parts by weight of the polyolefin, of a hindered piperidine compound represented by the following formula (II):

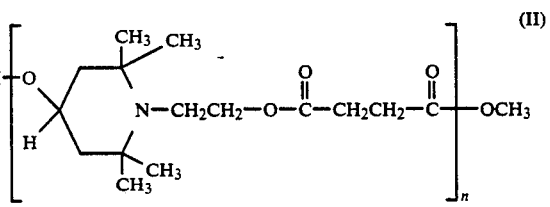

wherein n is 2 to 20.

14. The polyolefin fiber or film according to claim 13, wherein said composition further comprises an organic phosphorous antioxidant.

15. The polyolefin fiber or film according to claim 14, wherein said organic phosphorous antioxidant is bis(2,4-di-t-butylphenyl) pentaerythritol diphosphite, tris(2,4-di-t-butylphenyl) phosphite, bis(2,6di-ti-butyl-4-methylphenyl) pentaerythritol diphosphite, distearyl pentaerythritol diphosphite, or tetra-kis(2,4-t-butylphenyl) 4,4'-biphenylene diphosphonite.

16. The polyolefin fiber or film according to claim 14, wherein said organic phosphorous antioxidant is present in an amount of 0.01 to 1 part by weight per 100 parts by weight of the polyolefin.

* * * * *